(12) United States Patent
Dippel et al.

(10) Patent No.: US 12,226,954 B2
(45) Date of Patent: *Feb. 18, 2025

(54) APPARATUS, SYSTEM AND METHOD OF USING ADDITIVE MANUFACTURING TO FORM SHOE SOLE FOAM

(71) Applicant: JABIL INC., St. Petersburg, FL (US)

(72) Inventors: Nicholas Dippel, St. Petersburg, FL (US); Luke Rodgers, St. Petersburg, FL (US)

(73) Assignee: JABIL INC.

( * ) Notice: Subject to any disclaimer, the term of this patent is extended or adjusted under 35 U.S.C. 154(b) by 432 days.

This patent is subject to a terminal disclaimer.

(21) Appl. No.: 17/311,671

(22) PCT Filed: Dec. 6, 2019

(86) PCT No.: PCT/US2019/065079
§ 371 (c)(1),
(2) Date: Jun. 7, 2021

(87) PCT Pub. No.: WO2020/118260
PCT Pub. Date: Jun. 11, 2020

(65) Prior Publication Data
US 2022/0022594 A1   Jan. 27, 2022

Related U.S. Application Data

(60) Provisional application No. 62/776,321, filed on Dec. 6, 2018.

(51) Int. Cl.
B29C 64/153  (2017.01)
A43B 13/02  (2022.01)
(Continued)

(52) U.S. Cl.
CPC .......... B29C 64/153 (2017.08); A43B 13/026 (2013.01); B33Y 10/00 (2014.12);
(Continued)

(58) Field of Classification Search
CPC ..... B29C 64/40; B29C 64/153; B29C 64/165; B33Y 70/00; B33Y 70/10; B33Y 80/00; B29K 2075/00
See application file for complete search history.

(56) References Cited

U.S. PATENT DOCUMENTS 11,511,488 B2   11/2022  Grebe
2006/0251826 A1*  11/2006  Pfeifer .................. B01J 2/16
                                                         427/212

(Continued)

FOREIGN PATENT DOCUMENTS

CN   107383244 A   11/2017
EP   2295390   2/2015
(Continued)

OTHER PUBLICATIONS

"Powder Bed Fusion", 2022, Immensa, https://immensa.io/powder-bed-fusion-sls-vs-slm-vs-ebm-vs-mjf-additive-manufacturing/ (Year: 2022).*

(Continued)

Primary Examiner — Jasper Saberi
(74) Attorney, Agent, or Firm — Riverside Law LLP (57) ABSTRACT

The disclosed exemplary apparatuses, systems and methods provide a three-dimensional shoe sole foam, produced via a layer-by-layer additive manufacturing process in which regions of respective layers of pulverant are selectively melted via introduction of electromagnetic energy. These apparatuses, systems and methods may include layers of the pulverant comprising at least thermoplastic polyurethane polymer (TPU) coated upon a sacrificial base particle, (Continued)

wherein the TPU is coated via one of spray drying and a fluidized vessel.

18 Claims, 8 Drawing Sheets

(51) Int. Cl.

| | | |
|---|---|---|
| *B33Y 10/00* | (2015.01) | |
| *B33Y 70/00* | (2020.01) | |
| *B33Y 80/00* | (2015.01) | |
| *B29K 75/00* | (2006.01) | |
| *B29K 105/00* | (2006.01) | |
| *B29K 307/04* | (2006.01) | |
| *B29K 309/08* | (2006.01) | |
| *B29L 31/50* | (2006.01) | |
| *B33Y 70/10* | (2020.01) | |

(52) U.S. Cl.
CPC ............... *B33Y 70/00* (2014.12); *B33Y 80/00* (2014.12); *B29K 2075/00* (2013.01); *B29K 2105/0026* (2013.01); *B29K 2105/0044* (2013.01); *B29K 2307/04* (2013.01); *B29K 2309/08* (2013.01); *B29L 2031/504* (2013.01); *B33Y 70/10* (2020.01)

(56) References Cited

U.S. PATENT DOCUMENTS

| | | | |
|---|---|---|---|
| 2007/0267784 A1 | 11/2007 | Greiner | |
| 2011/0020630 A1* | 1/2011 | Gladysz | C08J 9/0066 521/142 |
| 2013/0012643 A1* | 1/2013 | Monsheimer | C09C 3/10 264/405 |
| 2014/0182170 A1* | 7/2014 | Wawrousek | A43B 5/02 702/155 |
| 2015/0314894 A1* | 11/2015 | Mazed | B64G 1/58 139/11 |
| 2016/0166011 A1* | 6/2016 | Bruce | A43B 23/0205 12/145 |
| 2016/0229975 A1 | 8/2016 | Noordegraaf et al. | |
| 2016/0243873 A1 | 8/2016 | Kim et al. | |
| 2016/0326284 A1 | 11/2016 | Farrugia | |
| 2017/0008233 A1 | 1/2017 | Vontorcik, Jr. et al. | |
| 2017/0028475 A1 | 2/2017 | Heikkila | |
| 2017/0051121 A1 | 2/2017 | Prissok et al. | |
| 2017/0260426 A1 | 9/2017 | Zhang | |
| 2017/0303633 A1* | 10/2017 | Hopkins | B33Y 80/00 |
| 2018/0230590 A1 | 8/2018 | Farquhar | |
| 2018/0305536 A1 | 10/2018 | Harrison | |
| 2018/0319078 A1 | 11/2018 | Ederer | |
| 2018/0319708 A1 | 11/2018 | Haque | |
| 2018/0327557 A1 | 11/2018 | Jaeckel | |
| 2018/0345576 A1* | 12/2018 | Constantinou | C08J 9/16 |
| 2019/0338106 A1 | 11/2019 | Kunc | |
| 2019/0344496 A1 | 11/2019 | Bartow | |
| 2020/0156291 A1 | 5/2020 | Iguchi | |
| 2020/0307085 A1 | 10/2020 | Grebe | |
| 2022/0048244 A1 | 2/2022 | Van Benthem | |

FOREIGN PATENT DOCUMENTS

| | | |
|---|---|---|
| JP | 2017149086 A | 8/2017 |
| WO | 2016145301 A1 | 9/2016 |
| WO | 2018108781 | 6/2018 |
| WO | 2019121490 A1 | 6/2019 |

OTHER PUBLICATIONS

"What is Syntactic Foam?", 2003, Engineered Syntactic Systems, https://ess.globecomposite.com/what-is-syntactic-foam (Year: 2003).*
International Search Report for PCT/US2019/065079, dated Nov. 6, 2020.
Written Opinion of the International Searching Authority, dated Nov. 6, 2020.
"Acrylic aka PMMA Chemical Compatibility Chart", Aug. 13, 2020, ISM, https://www.industrialspec.com/resources/ acrylic-aka-pmma-chemical-compatiblity-chart (Year: 2020).
"Chemical Properties of Technical Ceramics", 2023, CoorsTek, https://www.coorstek.com/en/materials/ chemical-properties-of-technical-ceramics/ (Year: 2023).
"3M Glass Bubbles K37", 2021, 3M, https://www.3m.com/3M/en_US/p/d/b40064628/#:~:text=3M%E2%84%A2%20Glass 20Bubbles% 20K37%20are%20lightweight%20hollow%20glass% 20microspheres,crush%20strength%20of%203%2C000%20psi.(Year: 2021).
"Solvents", 2021, ThermoFisher Scientific, https://www.thermofisher.in/chemicals/en/brands/qualigens/solvents.html#:~:te Nonpolar% 20solvents%20include%20alkanes%20(pentane,%2C%20methylene% 20chloride%2C%20and%20pyridine.(Year: 2021).
International Search Report for PCT/US2019/065035, dated Nov. 6, 2020.
Office Action (Final Rejection) dated Dec. 21, 2023 for U.S. Appl. No. 17/299,819 (pp. 1-21).
Office Action (Final Rejection) dated Dec. 26, 2023 for U.S. Appl. No. 17/311,655 (pp. 1-29).
Office Action (Non-Final Rejection) dated May 14, 2024 for U.S. Appl. No. 17/299,819 (pp. 1-31).
Written Opinion of the International Searching Authority for PCT/US2019/065035, dated Nov. 6, 2020.
Office Action (Non-Final Rejection) dated May 16, 2024 for U.S. Appl. No. 17/311,655 (pp. 1-28).

* cited by examiner

APPARATUS, SYSTEM AND METHOD OF USING ADDITIVE MANUFACTURING TO FORM SHOE SOLE FOAM

CROSS-REFERENCE TO RELATED APPLICATIONS

The present application claims benefit of priority to International Application No. PCT/US2019/065079, filed Dec. 6, 2019, entitled: "Apparatus, System and Method of Using Additive Manufacturing to Form Shoe Sole Foam," which claims priority to U.S. Provisional Application No. 62/776,321, filed Dec. 6, 2018, entitled: "Apparatus, System and Method of Using Additive Manufacturing to Form Shoe Sole Foam," the entirety of which is incorporated herein by reference as if set forth in its entirety.

BACKGROUND

Field of the Disclosure

The present disclosure relates to additive manufacturing, and, more specifically, to an apparatus, system and method of using additive manufacturing to form shoe sole foam.

Description of the Background

Three-dimensional (3D) printing is any of various processes in which material is joined or solidified under computer control to create a three-dimensional object. The 3D print material is "added" onto a base, such as in the form of added liquid molecules or layers of powder grain or melted feed material, and upon successive fusion of the print material to the base, the 3D object is formed. 3D printing is thus a subset of additive manufacturing (AM).

A 3D printed object may be of almost any shape or geometry, and typically the computer control that oversees the creation of the 3D object executes from a digital data model or similar additive manufacturing file (AMF) file. Usually this AMF is executed on a layer-by-layer basis, and may include control of other hardware used to form the layers, such as lasers or heat sources.

There are many different technologies that are used to execute the AMF. Exemplary technologies may include: fused deposition modeling (FDM); stereolithography (SLA); digital light processing (DLP); selective laser sintering (SLS); selective laser melting (SLM); inkjet print manufacturing (IPM); laminated object manufacturing (LOM); and electronic beam melting (EBM).

Some of the foregoing methods melt or soften the print material to produce the print layers. For example, in FDM, the 3D object is produced by extruding small beads or streams of material which harden to form layers. A filament of thermoplastic, wire, or other material is fed into an extrusion nozzle head, which typically heats the material and turns the flow on and off.

Other methods, such as laser or similar beam-based techniques, may or may not heat the print material, such as a print powder, for the purpose of fusing the powder granules into layers. For example, such methods melt the powder using a high-energy laser to create fully dense materials that may have mechanical properties similar to those of conventional manufacturing methods. Alternatively, SLS, for example, uses a laser to solidify and bond grains of plastic, ceramic, glass, metal or other materials into layers to produce the 3D object. The laser traces the pattern of each layer slice into the bed of powder, the bed then lowers, and another layer is traced and bonded on top of the previous.

In contrast, other methods, such as IPM, may create the 3D object one layer at a time by spreading a layer of powder, and printing a binder in the cross-section of the 3D object. This binder may be printed using an inkjet-like process.

Foam is used in many different products, such as seats in automobiles or homes, shoe soles, and so on. Currently there are many methods used to create foam, such as injection molding, continuous dispensing, continuous lamination, dispensing with gas blowing agents, and the like. However, none of these methods are able to produce a foam part that possesses gradient properties throughout a single continuous foam while also providing the correct dimensions for a finished part.

For example, sheets of foam may traditionally be created, such as by chemical dispensing, cooled and/or processed, and cut to size as they pass along a long conveyor system. However, such a conveyer system takes up significant space, and the aforementioned process is highly inefficient and takes significant time.

There do exist elastomeric materials that are employed to form foams using additive manufacturing (AM) technologies. By way of example, known elastomerics include polymer foam made using AM and PU, PS, PVC, Phenolic, Polyolefin, Melamine, and other polymers and polymer blends. However, while these materials can provide desirable properties, such as may include mechanical, thermal, or electrical properties, by way of example, they typically do so at the detriment of other properties, such as density, hardness, compression set, and rebound, for example.

Moreover, there exist methods to produce complex lattice structures using AM processes that mimic the behavior of foam. However, while these technologies do allow for custom elastomeric parts, the varying properties throughout the structure are not inherent to the printed material. Further, the process is very slow, as the material takes significant time to form into the complex non-inherent structure.

SUMMARY

The disclosed exemplary apparatuses, systems and methods provide a three-dimensional foam shoe sole, produced via a layer-by-layer additive manufacturing process in which regions of respective layers of pulverant are selectively melted via introduction of electromagnetic energy. These apparatuses, systems and methods may include layers of the pulverant comprising at least thermoplastic polyurethane polymer (TPU) coated upon a sacrificial base particle, wherein the TPU is coated via one of spray drying and a fluidized vessel. Additionally, the TPU and the additive may be combined in a mixing process instead of a coating process. The mixing process may be a dry mixing process to produce a dry blend.

The additive manufacturing processes may comprise one of selective laser sintering (SLS), powder bed fusion, binder jetting, and multijet fusion. The layers of the pulverant may further comprise one or more additives. The additives may comprise at least one of glass beads, glass fibers, carbon fibers, carbon black, metal oxides, copper metals, flame retardants, antioxidants, pigments, and flow aids. The base particle may be a void, a glass bead or a hollowed polymer.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed apparatus, system and method provide materials, and enable the production of additively manufactured parts from those materials, having properties presently unavailable in the known art. Further, embodiments include designs for specification that may match and/or correlate particular print materials, print material fillers, and printed output objects given one or more processes available to produce the printed output object.

Historically, the use of additive manufacturing (AM), such as 3D printing, to produce a three-dimensional foam part has been challenging and required custom machines and materials. The embodiments include materials and processes by which material is produced to more readily be used in existing AM technologies to produce foam parts for various industries.

The embodiments may allow for a part to be printed from the provided print materials, and then selectively cut or crushed to create a final foam part. The three-dimensional foam part produced using AM can be printed very rapidly using existing technologies. Further, the inherent elastomeric properties are more continuous throughout the printed part, and can thus be further tailored during and after the printing, than the known art.

Foam applications provided in the embodiments include, but are not limited to: footwear midsoles, insoles and outsoles; integral skin for vehicle interiors; bedding, such as mattress padding, solid-core mattress cores, and general padding; upholstery foams; furniture, such as cushions, carpet cushion, and structural foams; insulation, such as construction, wall/roof, window/door, and air barrier sealents; packaging; building materials; automotive exterior parts and facia; automotive and aerospace seating, interior trim, structural parts, and electronics; automotive seats, headrests, armrests, roof liners, dashboards and instrument panels; automotive steering wheels, bumpers and fenders; refrigeration and freezer insulation; construction and other moldings; seals and gaskets; foam core doors, walls and panels; bushings; carpet underlay; parts and insulators for electronic instrumentation; surfboards; foam for rigid-hulled boats; sporting goods, such as helmets, bike seats, padding, racquet grips, padding, and filler in rigid sporting goods; headsets; healthcare, such as for physical therapy molds, custom braces and orthopedic cushions; pillows; sound proofing; wheels, such as for wheelchairs, bicycles, carts and toys; and the like.

Figure 1:
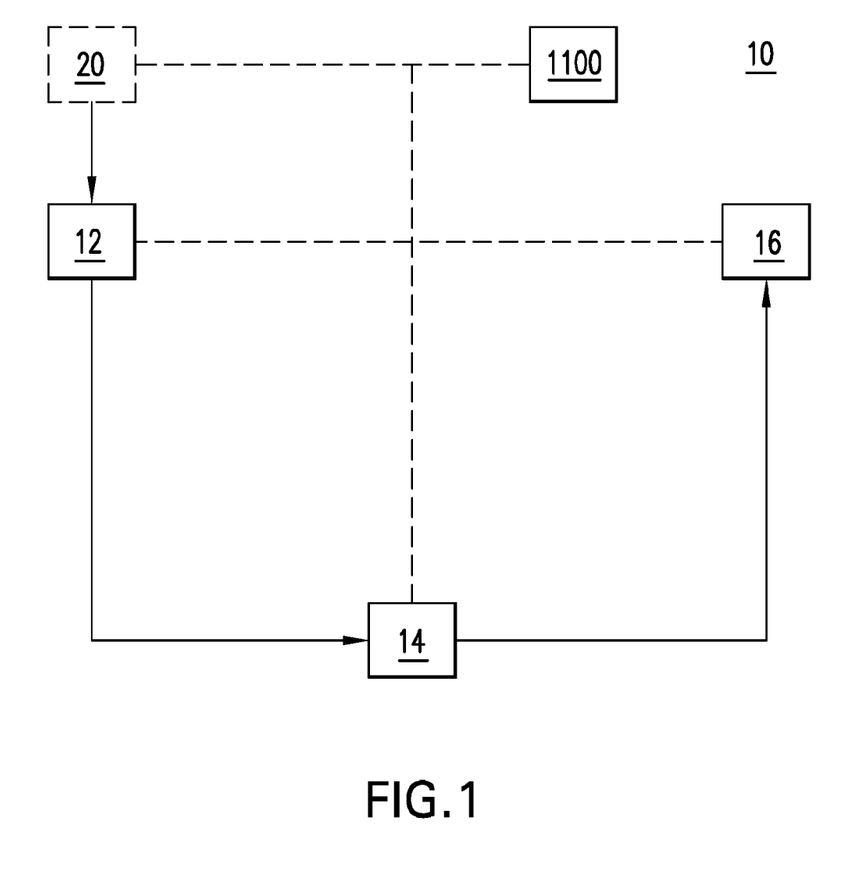
FIG. 1 is an illustration of an additive manufacturing printing system.

FIG. 1 illustrates a typical additive manufacturing (AM) system 10. In the illustration, a print material 12 is fed into a print process 14, such as the powder/pulverant-based AM processes discussed throughout, and the print process 14 outputs a printed 3D part 16. In the embodiments, the print material 12 may have the particular characteristics discussed herein, which may allow for the use of the print material 12 in any one or more processes 14, and which thereby result in any of various types of output parts 16 such as may have the characteristics discussed herein.

Figure 7:
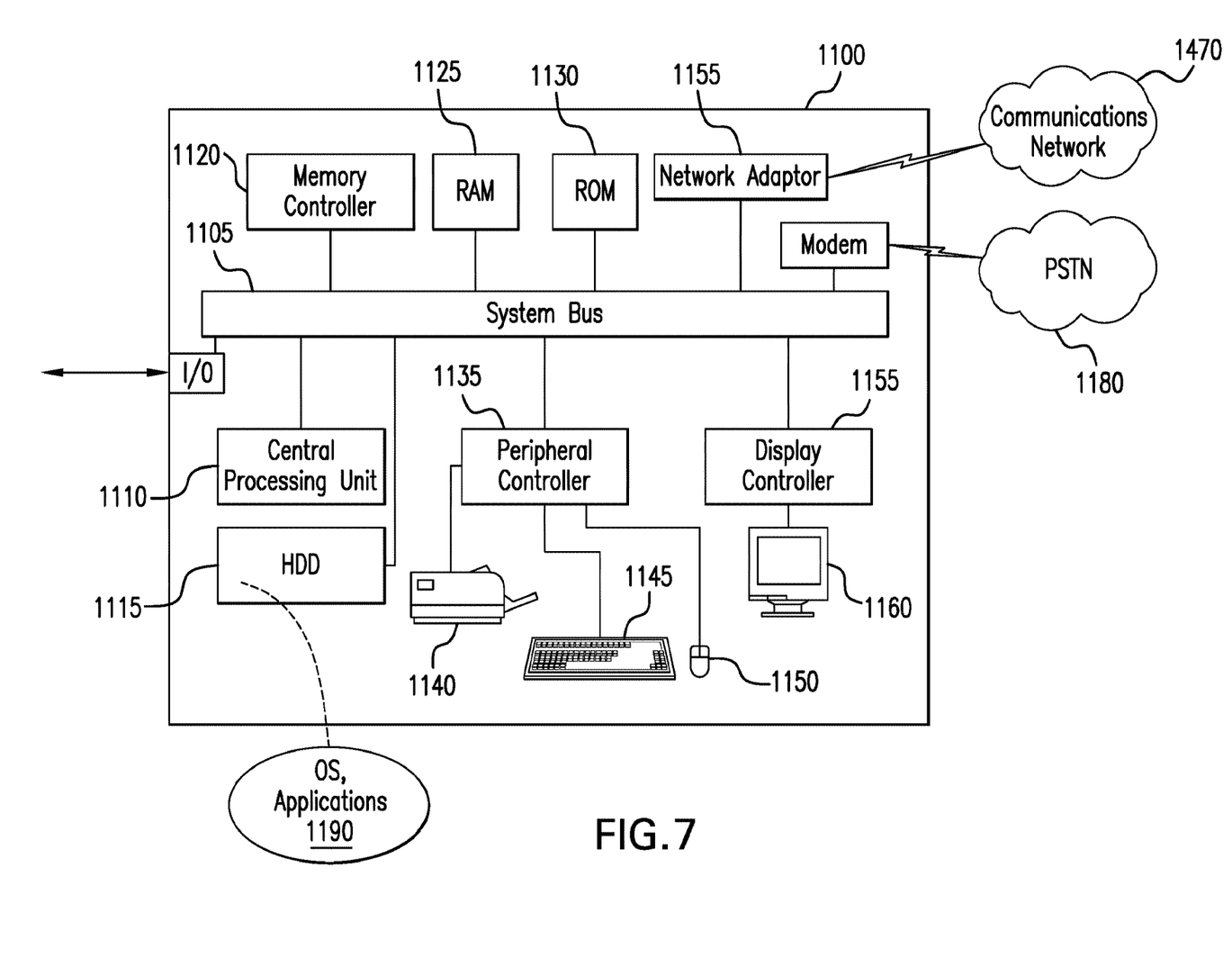
FIG. 7 illustrates an exemplary computing system.

Additionally, computing system 1100 may execute one or more programs/algorithms 1190 to control one or more aspects of system 10, as referenced throughout. By way of example, program 1190 may be the AMF referenced herein above, and the AMF 1190 may independently control at least process 14. The AMF may additionally control the selection and/or distribution of print material 12, compounds 12a, and/or additives and fillers, and may further modify processes 14, print materials 12, and so on in order to achieve a user-desired print output 16, as discussed further herein below.

More particularly, the embodiments include particular TPU-coated print materials 12. These materials 12 may include a TPU polymer coating on a low density particle, such as a microsphere, for example, and may additionally include one or more additives 20, such as may further enhance the operating characteristics and operating windows discussed throughout the disclosure, and such as are discussed further herein below.

Alternatively, a TPU polymer may be mixed with a low density particle, such as a microsphere, for example and may additionally include one or more additives 20, such as may further enhance the operating characteristics and operating windows discussed throughout the disclosure. Mixing may be accomplished by high shear blending, low shear blending, or a combination of high shear and low shear blending. To disperse particles in a dry solid state, the use of a high shear mixer is employed to break up agglomerates and obtain a fluidized state of mixing. Care should be taken to avoid high temperatures, and mixing tool design and other processing parameters can be optimized for batch time and repeatability. Masterbatches or concentrates of additives with the powdered bulk resin are initially formed. The concentrate or masterbatch is then blended, typically in a low shear blender, to disperse the additive and homogenize the blend.

As referenced, the disclosed print input materials 12 may be used in powder-based AM processes 14, such as those in which the powder 120 including the material 12 may be spread, melted in a targeted manner, and allowed to or processed to solidify, thus forming successive layers that result in a three-dimensional output object/part 16 having the characteristics discussed herein as indicative of both the process 14 and the input print material 12. Processes 14 may include, but are not limited to: Selective Laser Sintering (SLS), Selective Laser Melting (SLM), Selective Heat Sintering (SHS), High Speed Sintering (HSS), Multi Jet Fusion (MJF), Binder Jetting (BJ), Material Jetting (MJ), Laminated Object Manufacturing (LOM), and other AM technologies referenced herein, and/or AM technologies that utilize thermoplastic powders/pulverants as may be known to the skilled artisan. It will also be understood to the skilled artisan that other AM and similar processes 14 may be modified to employ the print materials 12 disclosed herein, including but not limited to injection molding, roto molding, vacuum molding, subtractive manufacturing, and so on.

Figure 2A:
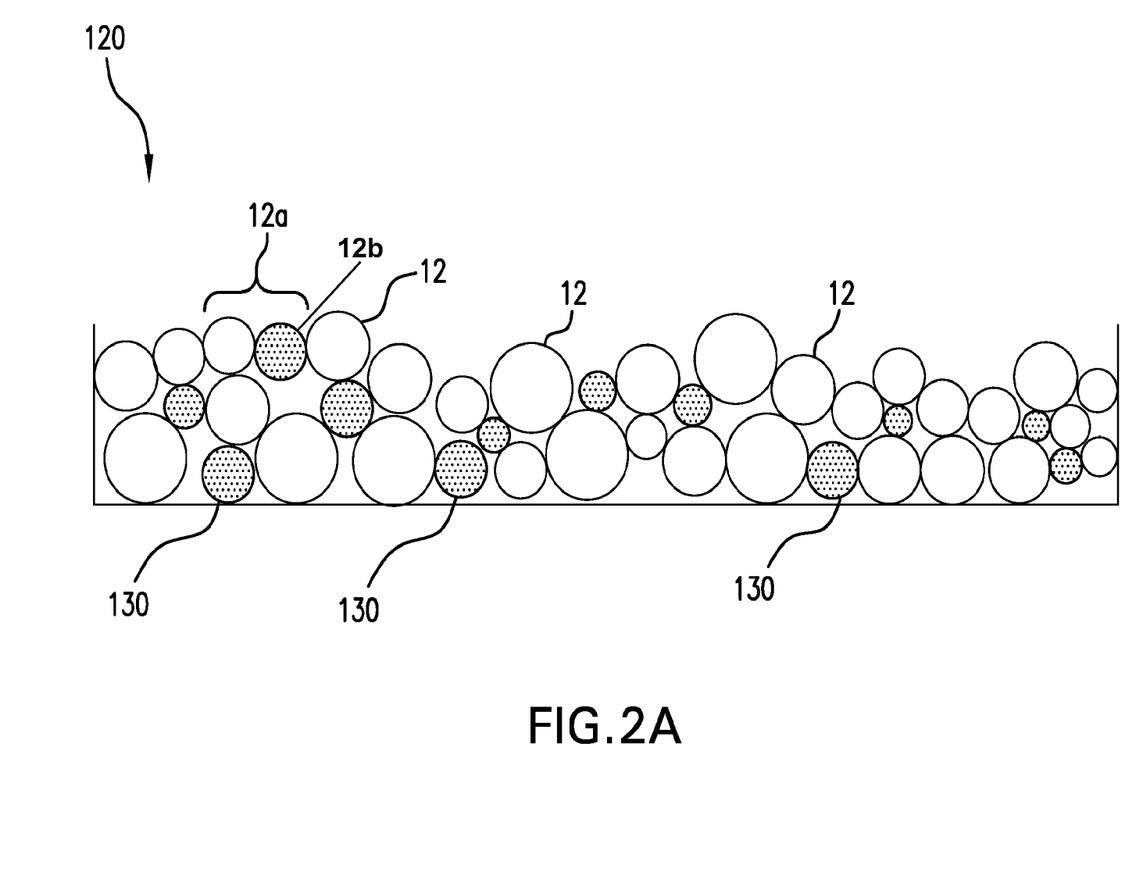
FIGS. 2A and 2B illustrate an exemplary print material compound.

As referenced above, and referring now specifically to FIG. 2A, additives 130 may be included with material 12 in forming powder 120. Additives 130 may provide desired characteristics to powder 120, may enable or improve aspects of processes 14, or may provide desired characteristics to output part 16 produced by exposure of the input print material 12 to process 14. Moreover, additives 130 may enable the particular characteristics of input print material 12 discussed herein. Additives 130 may include, by way of non-limiting example, glass beads, glass fibers, hollow glass spheres, carbon fibers, carbon black, metal oxides, copper metals, flame retardants, antioxidants, pigments, powder flow aids, inks, and so on. For example, ink additives 130 may allow for modification of print material 12 properties, such as may provide for different functional inks for use in multi-jet fusion AM printing or high speed sintering.

By way of example, a powder comprised of both additives 130 and print materials 12, that is, combined particles and/or compound 12a, may provide a lightweight, low density output with good rebound. Rather than avoiding porosity, as discussed above, embodiments of either print material 12, or combination/compound 12a may target higher levels of voids and porosity in the printed output 16, such that a foam is produced having a desired, lower density. This "TPU foam" output 16 may be used in a variety of applications, as it may produce a foam part that possesses gradient properties as desired throughout the single continuous part, while also providing the correct dimensions for the finished part in-process 14 as the gradient properties are imparted layer-by-layer.

More particularly, the disclosure includes a TPU foam 16 or similar AM "printed" object that is printed from a print material 12 having therein numerous voids or the like, which voids thereby make the printed output less dense than other layer-by-layer AM printed objects. As referenced above with respect to FIG. 2A, such a print material may be formed of combined particles 12a, wherein interstitial ones 12b of the combined particles may be sacrificial or low density such that, when combined with others in a combined particle print powder 120, the combined print material 12 provides a low density AM printed output. Ones of the combined particles 12a may also be compounds, such as discussed below with respect to FIG. 2B.

Figure 2B:
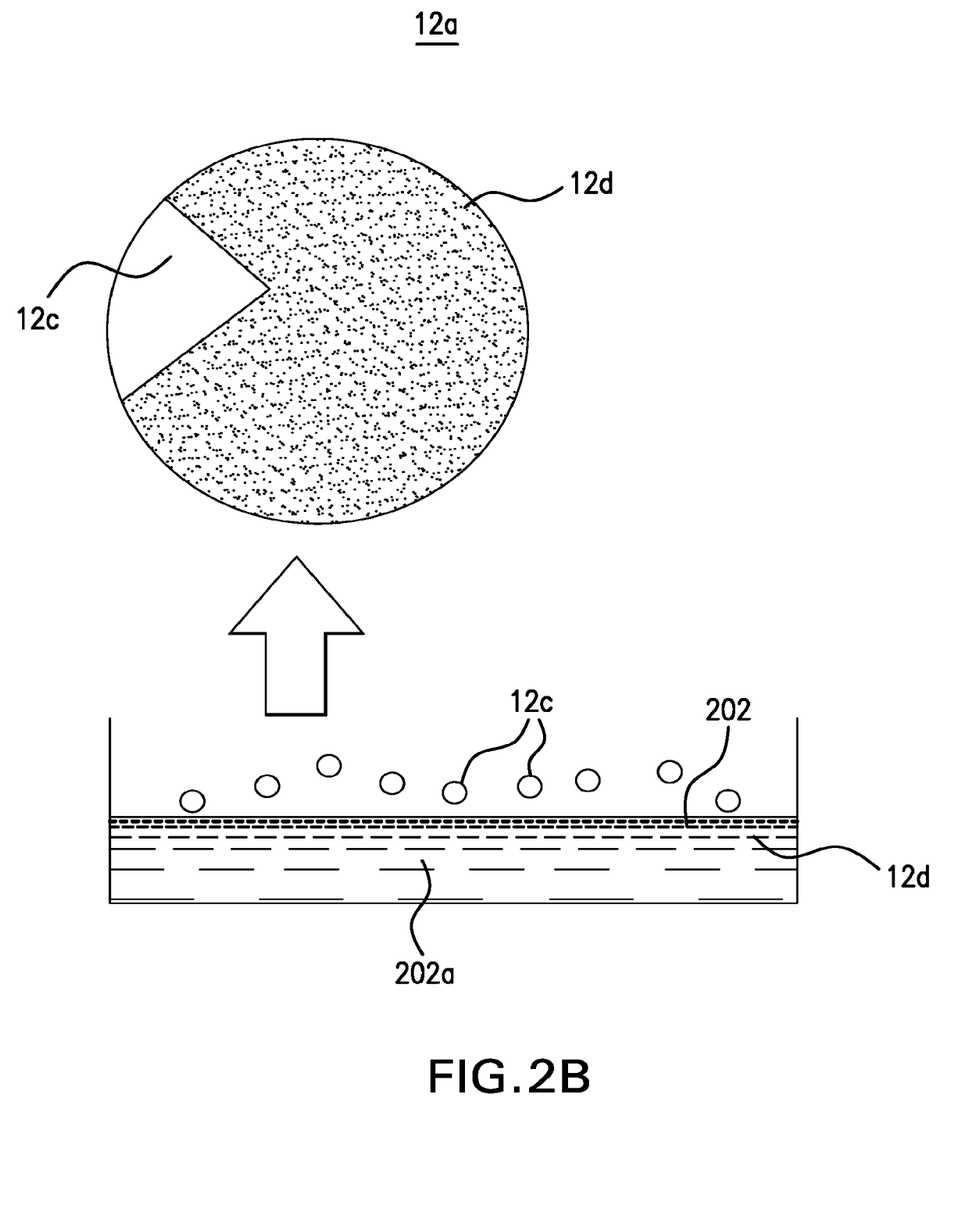

Similarly and as referenced throughout, FIG. 2B illustrates a compound print particle 12a, in which an inner-particle 12c, such as a sacrificial inner particle, is "coated" with a polymer 12d, such as a TPU coating, as further detailed herein. This coating 12d may be performed using any of the various methods discussed throughout, and results in a compound print particle 12a for use in the various AM processes 14 discussed throughout.

More particularly, and by way of example, a TPU polymer 12d may be placed into solution 202 to be coated onto a base particle 12c. In embodiments, the base particle 12c may be sacrificial in nature, i.e., may be a hollow or low density particle that is sacrificed in foam formation, such as a glass or polymer bead. In other embodiments for the purposes of this disclosure, the base particle 12c may be air or gas, i.e., may constitute the absence of a solid particle, and thereby an introduction of porosity into a TPU-"coating" 12d.

The solvent 202a may be a liquid or gas that serves as the medium for the coating reaction. The solvent 202a may be non-participatory with the reactants in the solution 202, wherein the solvent 202a does not participate in the reaction; or participatory, wherein the solvent 202a may be, for example an acid (proton), a base (removing protons), or a nucleophile (donating a lone pair of electrons) and may thereby contribute to the coating reaction.

Further, solvents 202a may be polar or non-polar, and may further be subjected to inversion as to polarity. Polar solvents have large dipole moments—that is, they contain bonds between atoms with very different electronegativities, such as oxygen and hydrogen. Non-polar solvents contain bonds between atoms with similar electronegativities, such as carbon and hydrogen, which thus lack partial charges, i.e., which thus lack polarity. Polarity inversion may include enhancing solvent properties, such as to produce porous TPU-"coated" particles as discussed throughout.

Any coating material 12d soluble in an organic solvent 202a (e.g., water, THF, MEK, cyclohexanone) will precipitate out of the solvent 202a upon drying. Thereby, a polymer-based substance with characteristics of common engineering thermoplastics is highly appropriate for use as coating material 12d in the disclosed embodiments.

For different applications, the soluble coating material 12d may vary in accordance with the application. For example, foam-centric applications may employ an elastomeric coating material 12d having high elongation, substantial rebound, and adequate compression. By way of non-limiting example, for footwear parts, such elastomeric materials 12d may be particularly common. Applicable elastomeric compounds may include: styrene block copolymers, thermoplastic olefins, elastomeric alloys, thermoplastic polyurethanes, thermoplastic copolyesters, thermoplastic polyamides, ethylene-vinyl acetate, ethylene propylene rubber, ethylene propylene diene rubber, polyurethanes, silicones, polysulfides, elastolefins, high density polyethylene, low density polyethylene, linear low density polyethylene, polypropylene, polyolefin copolymers, polystyrene, polystyrene copolymers, polyacrylates, polymethacrylates, polyesters, polyvinylchloride, fluoropolymers, liquid crystal polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, liquid crystal polymers and/or combinations thereof.

The goal of the foregoing may be to obtain print particles 12a and/or a TPU foam output 16 having particular characteristics. Among these characteristics may be: hardness of 60±25 Shore A; specific gravity of less than 1.0; compression set of maximum 60%, and more particularly of <40%; rebound/resilience of minimum of 35%, and more particularly of >50%; elongation of minimum of 100%; a target particle size of 10 to 180 microns, more particularly, 30 to 150 microns; tensile strength of a minimum of 2 N/mm2. Additional characteristics may relate to shrinkage, light fastness, flex testing, parallel tear strength, reusability, and flowability, by way of non-limiting example.

Figure 3:
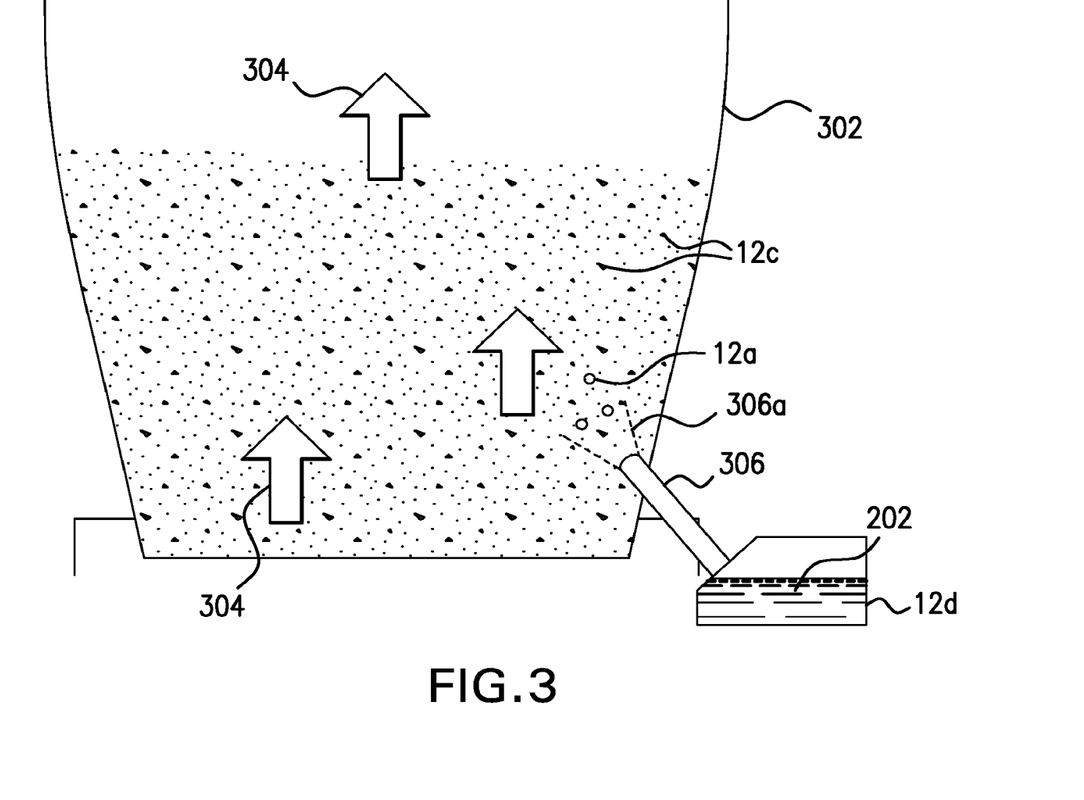
FIG. 3 illustrates print particle formation.

In embodiments, to obtain one or more of the foregoing characteristics, the TPU may be suitable coated onto an absence of a particle, a unitary particle type, a compound particle, or a particle blend, acting as the base particle 12c, to form the print material 12a to be used in an AM creation of TPU foam 16 through the use of one or more of several AM processes, as discussed throughout. By way of example and as illustrated in FIG. 3, particles 12c may be placed in a vessel 302 and fluidized 304, such as using a gas 304 with controlled flow.

More particularly, a spray nozzle 306 inside the vessel 302 may spray 306a a solution 202 containing the selected polymer coating 12d and any necessary or desired solvents, dispersants or additives, onto base particles 12c. Upon coating, the combined/compound print particles 12a may be actively dried, such as after or during the fluidization and/or spraying. This spray process may be repeated, such as until all the print particles 12a have been coated and dried. Once dried, the coated particles 12a may be collected, and may be further processed, such as by additional drying, post-process particle treatment, or the like, as and if needed.

Figure 4:
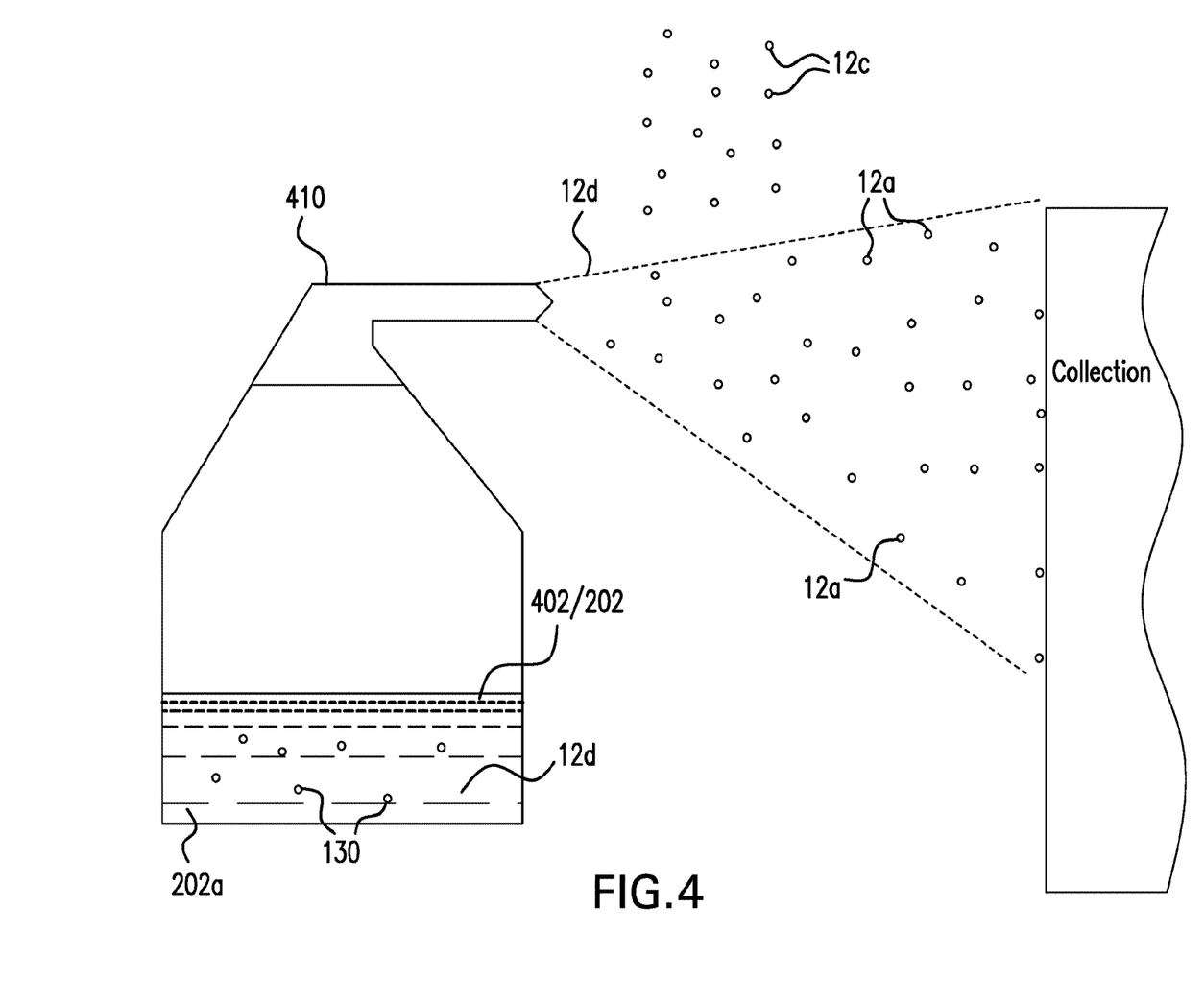
FIG. 4 illustrates print particle formation.

Additionally and alternatively, spray drying may be used to coat TPU 12d onto base particles 12c, as illustrated in FIG. 4. By way of example, a liquid feed solution 402 may be made by dissolving a polymer 12d into a suitable solvent(s) 202a, and adding thereto any dispersants or other additives. The solution 202 may be mixed, such as to reach homogeneity. In order to form foam 16 with the requisite porosity upon AM processing, to the mixture may be added additives 130, such as hollow metal oxide and/or polymeric microspheres, for example.

After the addition of the additives 130, only low shear forces may be applied so as to not damage the delicate spherical additive particles in solution 202. Accordingly, low shear mixing methods may be used. For example, while the solution is being gently agitated, it may be fed into a sprayer/dryer 410.

The sprayer dryer 410 may include an atomizer disc and a nozzle spray head, or other like-technology to atomize to provide a liquid feed. Parameters of interest to provide the liquid feed spray may include, but are not limited to: inlet temperature, exhaust temperature, HEPA pressure, chamber pressure, cyclone pressure, bagfilter pressure, disc rotating speed, liquid volume ml/min, and so on.

The solution spray 202 may be dried as it is atomized, to thereby form a coating 12d onto the base particles 12c. It may be preferred that only individual spherical base particles 12c are coated in the embodiments, and thus it may be desirable that agglomeration is kept to a minimum. The dried, powdered print material 12a may then be collected using known methodologies. Paddle, belt high shear mixing and screen drying may also be used in the embodiments, wherein, in each such case, the process is similar to that discussed herein with respect to spray drying. A high shear mixer may be used to coat base particles 12c with coating 12d. The high shear mixer may be heated. For example, the high shear mixer may be heated from 20° C. to 350° C. Coating 12d and base particles 12c may be added simultaneously to the high shear mixer before mixing. Alternatively, base particles 12c may be first loaded into a high shear mixer and the high shear mixer may start to mix in the absence of coating 12d. Coating 12d may be added or sprayed into the high shear mixer to coat the previously loaded base particles 12c. The high shear mixer may function to dry a coating 12d onto the base particles 12c.

More specifically and by way of example, paddle drying or high shear mixing may use an indirect heat/cool source with a rotating shaft having adjustable paddles/blades to properly mix/crystallize/react the solution. After recovery of the solvent, the coating material 12d may be dried/reacted/precipitated/coated onto base particle microspheres 12c over a predetermined length of time, after which time the output product 12a may be collected. By way of particular example with respect to belt drying, the coating material 12d may be sprayed onto a continuous belt having thereon base particles 12c, which rides into an oven that further dries the combined print material 12a. The dried and coated spherical print materials 12a are then collected using known methods. For screen drying, the coating material 12c may be sprayed onto a screen or a rigid substrate that includes base particles 12c, and the screen or substrate may then be dried and the coated particles 12*a* harvested therefrom.

The TPU-coated print particles 12*a* may also be generated using general conversion. That is, a liquid feed may be used to form a solid product, such as the afore-discussed print powder particles 12*a*. A lubricant or antistatic agent may be used to deagglomerate particles, by way of example. The material used in a general conversion process may typically have a low glass transition temperature, thereby making the material "tacky" and soft at elevated temperatures. The feed may typically comprise a polymer dissolved in a solvent, such as with a dispersant, to allow for the feed to be "sprayed onto" an activated sphere.

The coated print particles 12*a* thus created may additionally comprise flow agents, lubricants (such as silica gel), carbon black, or other additives needed to make the particles more "printable" in the selected AM technology. Yet further, coated print particles 12*a* may be packaged so as to retain the desired properties, such as being packaged to prevent overheating, to prevent any contact with chemicals, and/or to prevent accidental crushing.

Figure 5:
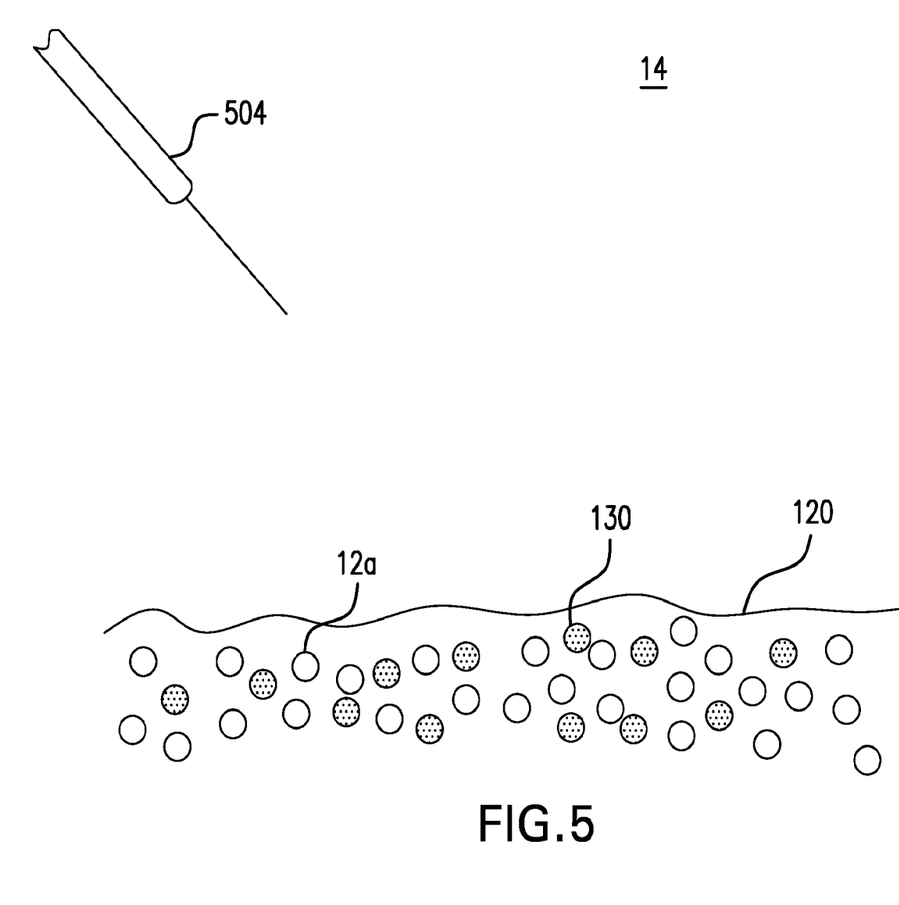
FIG. 5 illustrates TPU-coated materials printing.

Once the coated print particles 12*a* are created, they may be printed using an AM process 14, as illustrated in FIG. 5. The AM printing process 14 may use a laser 504, and thus may be, for example, a dry blend SLS print. In such an embodiment, the TPU-coated particles 12*a* may be dry blended with hollow glass microspheres 130, and the blended powder 120 may then be printed to a form 16, layer-by-layer, using an SLS printer as discussed above. Hollow glass microspheres 130 may be made of, by way of example, soda-lime-borosilicate, perlite, sodium borosilicate, clay and the like. Additionally, various other hollow microspheres 130*b* can also be used. For example, hollow microspheres 130*b* may be made from ceramic hollow microspheres such as alumino-silicate microspheres (Cenospheres) and the like. Similarly, various plastic microspheres such as those based on phenolic and amino polymers or made of a copolymer such as vinylidene chloride, acrylonitrile or methyl methacrylate that encapsulate a hydrocarbon blowing agent, such as isobutene or isopentane. Additional coating and functionalization of the microspheres is possible through the addition of a coating of a metal such as aluminum, silver, copper, stainless steel, platinum, zinc or gold. In another example, hollow microspheres may also be utilized.

In another embodiment, carbon spheres may be used, which may be comprised of carbon nanotubes bonded to the surface of spheres made from graphitization or pyrolysis of polymer spheres. The syntactic foam part that results of the additive manufacturing process may contain any of the above, in any combination. Typical microsphere sizes range from 1 to 200 μM.

Alternatively, base particles 12*c* may be dry blended with hollow glass microspheres 130 or another light weight filler and the blended powder may then be printed to form an output part 16. The light weight filler may comprise an acrylic copolymer that encapsulates a blowing agent. The blowing agent may comprise isobutane. Alternatively, the light weight filler may comprise phenolic microspheres comprising phenol formaldehyde resin. Alternatively, the light weight filler may comprise cenospheres, which may comprise alumino-silicate microspheres. The combination of polymer matrix and microsphere produces syntactic foams, where previously this technology has not been utilized in powder bed additive manufacturing. Crush strength can be tuned by defining the wall thickness and particle size distribution of the light weighting filler used. Table 1 illustrates the ranges of particle size and density values of several low density microspheres. Table 1.

TABLE 1

Ranges of particle size and density values of low density microspheres.

| Microsphere | Typical True Density (g/cc) | Typical average particle size, Volume D50 (μm) |
|---|---|---|
| Phenolic | 0.1 to 0.4 | 5 to 150 |
| Acrylic copolymer | 0.02 to 0.2 | 15 to 95 |
| Hollow Glass | 0.12 to 0.6 | 1 to 200 |
| Carbon | 0.04 to 0.3 | 5 to 150 |

Similarly, wherein the AM printing process is a powder bed fusion process, a single thin layer, such as an approximately 0.1 mm thick layer, of compound print material 12*a* in powder 120, such as may be created using the methodologies discussed above, may be spread over a build platform. The laser 504 may then fuse the first layer, or first cross section, of the model. Thereafter, a new layer of the compound print material 12*a* in powder 120 is spread across the previous layer, such as using a roller. Further layers or cross sections may then be added until the entire model is created. Loose, unfused powder print material may remain in position throughout, but may be removed during post processing, by way of non-limiting example.

Also in a manner similar to that of FIG. 5, binder jetting may use a "binder", rather than or in addition to a laser 504. In such an embodiment, the powder print material 12*a* may be spread over the build platform, such as using a roller. A print head may then deposit a binder adhesive on top of the powder where required. The build platform may then be lowered by the model's layer thickness. Another layer of powder may then be spread over the previous layer, and the object is formed where the powder is bound to the liquid, layer-by-layer.

An ink jet based methodology, such as multijet fusion or high speed sintering may operate in a manner similar to the powder bed fusion, but may employ heat lamps or similar technologies, rather than a laser. Likewise, in a directed energy deposition AM method, an axis arm with a nozzle may move around a fixed object, and the print material 12*a* may be deposited from the nozzle onto existing surfaces of the object. The material may be provided, by way of example, in wire/filament or powder form, and may be melted for dispersal from the nozzle using a laser, electron beam or plasma arc.

Various other methodologies may provide a suitable format for the combined/compound print particles 12*a* to enable or improve printing using AM technologies. For example, a sheet may be made from the combined/compound powder print materials, or a filament may be provided. Moreover, additives may be provided in the print material to enable or improve printing and/or foam formation. Additive materials may include, but are not limited to, hollow metal oxide beads or hollow polymeric spheres, solid glass bead, glass fibers, talc, nonoclay, carbon fibers, carbon black, metal oxides, copper metals, flame retardants, antioxidants, pigments, crosslinking agents, chain extenders, thermoplastic polymer powders and flow aids. Such beads or spheres may provide varied crushing behavior in voidforming for foam formation. Yet further, certain additives may be used in particular for certain foam types, such as blow-molded foams.

In each such embodiment, parameters of interest for the combined/compound print material 12a may include parameters such as moisture level, heat of build chamber, heater power and temperature emitted, time of heat exposure, time between layers, recoating rate/thickness, feed rate, feed temperature, pressure and vacuum, gas flow rate, and the like. In short, the TPU coating 12d on the inner-particle 12c melts, such as upon exposure to a laser, and thus fuses to nearby particles during an AM process. As such, the print material 12a should melt during the selected AM print process 14 past its respective TPU-coating melting point, and should be subjected to a lowered modulus sufficient for the TPU-coating to flow. Under such circumstances, the respective polymer chains may suitably bond with those of the particle next to each particle, to form output 16. The selected AM print process 14 may allow that bond to cool, and thus the cooled particle chains form a solid layer in output 16. Of course, each print material 12 may also be subjected to additives 130 as discussed throughout, such as may aid with melting or flow during melting, with impact resistance, or with heat stabilization, by way of example, dependent upon the AM process selected. Where a dry mixture of TPU and a light weight filler are used in an AM process, the TPU will melt and fuse to nearby particles upon exposure to electromagnetic energy while the light weight filler will not melt.

Figure 6:
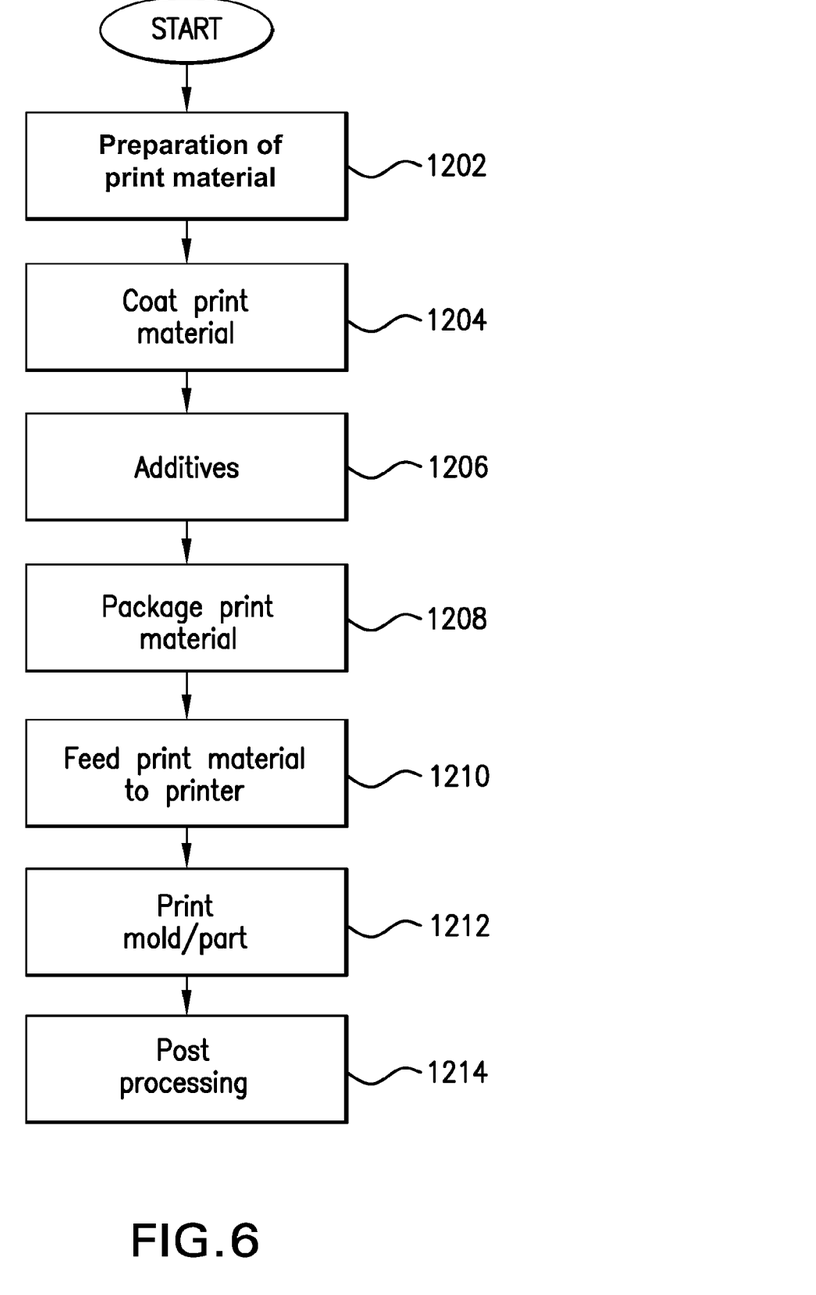
FIG. 6 illustrates an end-to-end shoe sole formation process.

In a specific exemplary embodiment of the foregoing, and as illustrated in FIG. 6, an end-to-end AM process, such as a shoe sole making process, may include preparation of the print material, which may include drying, cleaning, etching, dissolving the polymer, and the addition of additives such as dispersing agents, anti-static agents, surfactants, viscosity modifiers, and flow agents, at step 1202. Thereafter, the print material may be subjected to a liquid-solid conversion to form coated particles at step 1204. Additional processing, such as drying, infusing additives, and so on may be performed at step 1206.

The print material, once formed, may be packaged for printing at step 1208. This packaging at step 1208 may be tailored to the specific AM print process to be employed. The print material may be fed into an AM printer at step 1210, and a part printed therefrom at step 1212. The AM printer feed 1210 may include an AMF, as discussed above, which may include the desired layer-by-layer gradients for the final part, a shape and a size of the final part, and so on. The part may be post processed, cut, and/or crushed to form the final part at step 1214.

More specifically, step 1214 may comprise a shoe sole making process. The process 1214 may include crushing using a roller, wherein the roller may have a built in mold, and wherein a continuous feed of printed parts may be fed into roller. Similarly, a CNC 3 axis or 5 axis machine may apply a crushing force over a particular area of the printed part.

A hot isostatic compaction may also be employed. Hammering or stamping may be used as well, such as to simply crush the areas of the printed parts that are needed. Stamping or hammering may provide the desired contours and gradient properties, such as for attachment to a shoe.

In short, step 1214 may include changing the mechanical integrity of the part. After the change in mechanical integrity, step 1214 may further comprise additional cleaning or finishing steps, such as annealing, coating, curing, treating, washing the part, or any other process which would prepare the part, such as a shoe sole, for bonding.

Of course, step 1214 may also comprise in situ part formation, such as combined outsole and insole, using the native AM processes. As such, in addition to the foregoing, adhesives, heat, coloring, finishing, coating (including, e.g., antimicrobial) may be added along the process (i.e., the cutting or crushing) path at step 1214 to create and/or attach the final part. As such, the embodiments may eliminate the historical need for adhering together different aspects of a shoe.

Yet further, post processing may include the cleaning of residual powder from the "part cake," which cleaning may include: brushing, blowing, grit blasting, tumbling, shaking, spraying, bathing, or other methods of cleaning the part, by way of non-limiting example.

In the aforementioned exemplary embodiment of a shoe sole, the disclosed processes eliminate at least: excess rubber trim-off; the need for mixing of rubber/molding compound; the fusing of insole and outsole; human labor in the molding process, and thus human error in molding process; disclosure of the release-agent chemistries for most of shoe sole; the need for adhesives or bonding agents between layers of the shoe; and the like. The may also provide several advantages, including: allowing for quick iterations on design of footwear, thereby reducing design time and costs; allowing for multiple footwear designs, each with multiple properties, to be produced in the same build, thereby reducing production costs and time.

As such, an output part 16 processed as described herein may provide correlated characteristics that are indicative of, and/or correlated to, the input material 12a, and which occur pursuant to application of AM process 14, as described herein throughout. Such correlated characteristics may be measured, by way of non-limiting example, by heat-flowing a sample of the input 12a and/or the output 16, and then measuring thermal characteristics of the heat-flowed sample, such as Tm, Tg, Tcryst, heat of fusion, and the like. Likewise, infrared microscopy may allow for identification of the wavelengths of the corresponding chemical structures of the input material and/or the output object layers. Yet further, a thermogravimetric or similar analysis may be performed on a sample of the input material 12a or printed output 16, and this analysis may further include measurement of the composition of decomposition gases as the sample degrades, by way of example.

Of course, in view of the aforementioned prospective correlation of characteristics between an input print material 12a and a printed output object 16, the correlated characteristics of output object 16 may vary dependently not only in accordance with the input material 12a, but additionally based upon the process 14 employed to print the print material 12a into the output object 16. Accordingly, one or more computing programs/algorithms 1190, such as may comprise one or more AMF files; one or more input material 12a and/or additive 130 choices; one or more process 14 choices and/or one or more process characteristics choices; and/or one or more output 16 shape, size, and/or characteristic choices, may be executed by a computing system 1100. This execution may occur, for example, pursuant to an instruction to a GUI, such as to provide a particular correlation as between a TPU-coated input material 12a and/or additives 130 and a specific output object characteristic, and/or to use a particular available input material 12, using an available process 14, to target the ultimate production of a particular output object 16. This is illustrated with particularity in FIG. 7.

More particularly, FIG. 7 depicts an exemplary computing system 1100 for use in association with the herein described systems and methods. Computing system 1100 is capable of executing software, such as an operating system (OS) and/or one or more computing applications/algorithms 1190, such as applications applying the correlation algorithms discussed herein, and may execute such applications 1190 using data, such as materials and process-related data, which may be stored 1115 locally or remotely.

That is, the application(s) 1190 may access, from a local or remote storage locations 1115, different TPU powders, fillers and compounds; powder-centric processes; and output object characteristics. The application 1190 may then allow a user, such as using a GUI, to select, for example, an input material, and, such as based on user selection of a process and/or process characteristics to which the input material was to be subjected, to provide the user with a variety of characteristics of the output object characteristics. Of course, likewise, a user may select desired output characteristics, and may be able to select one or more processes and/or process characteristics, and may be provided with an input material (including compound and/or fillers) that may be needed to obtain he desired selected output using the selected process.

More particularly, the operation of an exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software, such as an operating system (OS), executable programs such as the aforementioned correlation applications, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or other presentations generated by or at the request of computing system 1100, such as in the form of a GUI, responsive to operation of the aforementioned computing program(s). Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A three-dimensional foam part, produced via a layer-by-layer additive manufacturing process in which regions of respective layers of pulverant are selectively melted via introduction of electromagnetic energy, comprising:
    the layers of the pulverant comprising:
        at least thermoplastic polyurethane polymer (TPU) coated upon a sacrificial base particle, wherein the TPU coats the sacrificial base particle via one of spray drying and a fluidized vessel to create a coated sacrificial base particle which imparts a density of foam in conjunction with adjacent TPU coatings on adjacent others of the sacrificial base particle upon the selective melting; and
        wherein the sacrificial base particle comprises a non-void microsphere with a density from 0.02 g/cc to less than 0.1 g/cc, wherein the non-void microsphere comprises a particle size from 1 to 200 microns, wherein the melted layers of the pulverant comprise a hardness from 35 to 85 Shore A.

2. The three-dimensional foam part of claim 1, wherein the process comprises one of powder bed fusion, binder jetting, and multijet fusion.

3. The three-dimensional foam part of claim 1, the layers of the pulverant further comprising one or more additives.

4. The three-dimensional foam part of claim 3, wherein the one or more additives comprise at least one of glass beads, glass fibers, carbon fibers, carbon black, metal oxides, copper metals, flame retardants, antioxidants, pigments, and flow aids.

5. The three-dimensional foam part of claim 3, wherein the additives are mixed into the pulverant.

6. The three-dimensional foam part of claim 1, wherein the TPU coating comprises a drying, wherein the drying is produced by one of paddle drying, belt drying, and screen drying.

7. The three-dimensional foam part of claim 1, wherein the one of the spray drying and the fluidized vessel comprises a solvent, wherein the solvent comprises one of polar and non-polar.

8. The three-dimensional foam part of claim 1, wherein the one of the spray drying and the fluidized vessel comprises a solvent, wherein the solvent is organic.

9. The three-dimensional foam part of claim 1, wherein aspects of the layers are cut after the process.

10. The three-dimensional foam part of claim 1, wherein the TPU coats via other than spray drying.

11. The three-dimensional foam part of claim 1, wherein the three-dimensional foam part comprises a sole produced by crushing at least a portion of the three-dimensional foam part to sacrifice the sacrificial base particle of the coated sacrificial base particle therein.

12. The three-dimensional foam part of claim 11, wherein the sacrificial base particle of the coated sacrificial base particle is one of a glass bead and a hollowed polymer, wherein the hollowed polymer is of a distinct structure from the thermoplastic polyurethane polymer of the coated sacrificial base particle.

13. The three-dimensional foam part of claim 11, wherein the sole is an insole.

14. The three-dimensional foam part of claim 11, wherein the sole is an outsole.

15. The three-dimensional foam part of claim 11, wherein the sole is a combined insole and outsole.

16. The three-dimensional foam part of claim 12, wherein the sacrificial base particle comprises a non-void microsphere comprising an acrylic copolymer microsphere.

17. The three-dimensional foam part of claim 12, wherein the sacrificial base particle comprises a non-void microsphere comprising a carbon microsphere, wherein the carbon microsphere comprises carbon nanotubes bonded to the surface of the carbon microsphere made from graphitization or pyrolysis of polymer spheres, wherein the particle density is at least 0.04 g/cc.

18. The three-dimensional foam part of claim 17, wherein foam comprises a syntactic foam, wherein the syntactic foam is based on the carbon microsphere and a polymer matrix created from at least the TPU.

* * * * *